(12) United States Patent
Lou et al.

(10) Patent No.: US 6,745,005 B1
(45) Date of Patent: Jun. 1, 2004

(54) METHOD AND APPARATUS FOR REDUCING SIGNAL INTERFERENCE IN SATELLITE BROADCAST SYSTEMS EMPLOYING TERRESTRIAL REPEATER STATIONS

(75) Inventors: Hui-Ling Lou, Murray Hill, NJ (US); Vijitha Weerackody, Watchung, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/372,706

(22) Filed: Aug. 11, 1999

(51) Int. Cl.$^7$ ................................. H04B 7/185
(52) U.S. Cl. .................. 455/13.1; 455/10; 455/16; 455/21; 455/3.02
(58) Field of Search ............... 455/13.1, 11.1, 455/12.1, 13.2, 7, 10, 15, 16, 18, 20, 21, 22, 23, 3.02

(56) References Cited

U.S. PATENT DOCUMENTS 5,864,579 A * 1/1999 Briskman ............... 455/13.1 X
6,125,109 A * 9/2000 Fuerter ................... 455/11.1 X

* cited by examiner

*Primary Examiner*—Nay Maung
*Assistant Examiner*—Philip J. Sobutka
(74) *Attorney, Agent, or Firm*—Jean-Marc Zimmerman

(57) ABSTRACT

A method and apparatus for reducing deep fading of signals in satellite-based communications systems employing terrestrial repeater stations by shifting the phase of the signals transmitted from each terrestrial repeater station by a different amount so that the signals are transmitted from each terrestrial repeater station and received at a receiver at different phases, thereby effectuating time diversity in such signals to reduce deep fading of the signals. The method and apparatus can be used in CDMA and OFDM systems.

8 Claims, 1 Drawing Sheet

METHOD AND APPARATUS FOR REDUCING SIGNAL INTERFERENCE IN SATELLITE BROADCAST SYSTEMS EMPLOYING TERRESTRIAL REPEATER STATIONS

FIELD OF THE INVENTION

This invention relates to satellite broadcast systems, and more particularly to a method and apparatus for reducing deep fading of signals transmitted from terrestrial repeater stations used in such systems.

BACKGROUND OF THE INVENTION

Terrestrial repeater stations are used as part of conventional satellite-based communications systems to amplify and re-transmit channel encoded signals as they travel from a satellite to their intended final destination, such as a mobile receiver. Typically, a plurality of repeater are employed to provide good signal coverage in a particular metropolitan area.

FIG. 1 shows a diagram of a conventional repeater station 10 in which a receive antenna 11 receives an RF signal from a satellite. The received signal is then filtered by a baseband filter 12 before being amplified first by a low-noise amplifier 13 and then by a high-power amplifier 14. The amplified signal is then transmitted by a transmit antenna 15 to its intended final destination.

Conventional satellite-based communications systems which employ terrestrial repeater stations suffer from a significant drawback. Specifically, since each one of the repeater stations transmit identical signals, these signals often destructively add together forming an interference pattern that severely degrades the quality of the signal received at its intended final destination. The periods of time during which such interference prevents strong, clear signals from being received is commonly referred to as deep fading.

SUMMARY

A method and apparatus for reducing signal interference in satellite broadcast systems employing terrestrial repeater stations by adding a time-varying radio frequency (RF) phase shift to each signal transmitted from the terrestrial repeater stations, thereby effectuating time diversity in such signals so that strong, clear signals are received at a receiver.

DETAILED DESCRIPTION OF THE INVENTION

Figure 1:
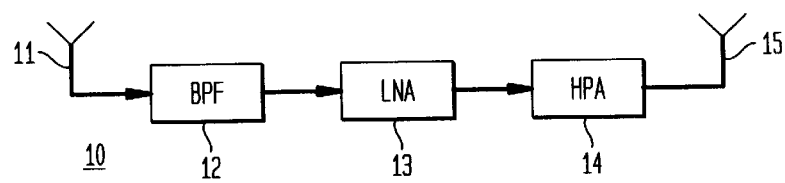
FIG. 1 shows a conventional terrestrial repeater station used in satellite broadcast systems.
Figure 2:
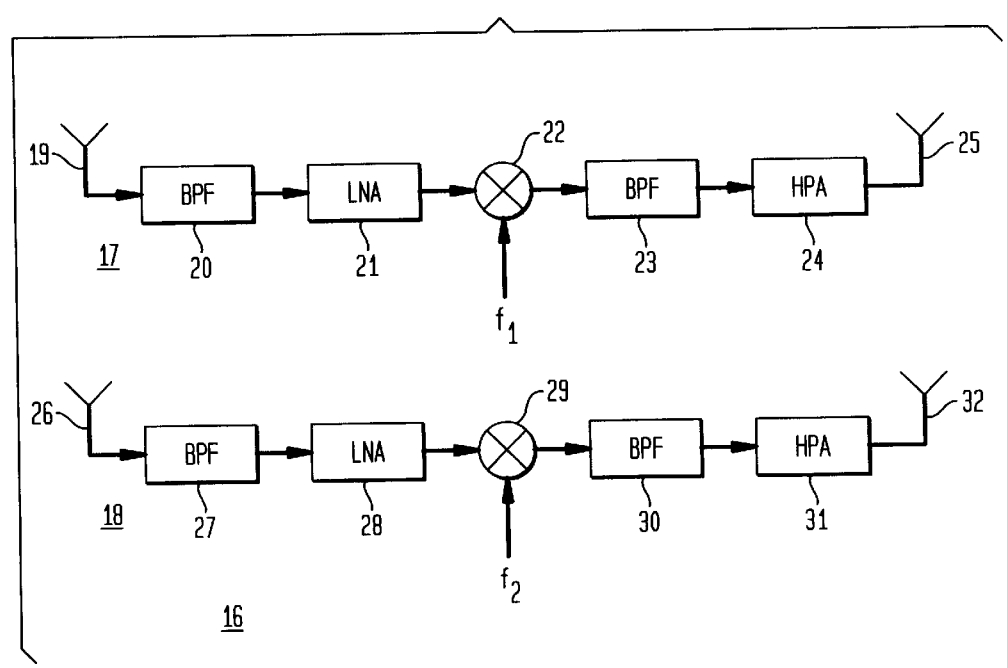
FIG. 2 shows an exemplary embodiment of a satellite broadcast system employing terrestrial repeater stations according to the present invention.

FIG. 2 shows an exemplary embodiment of a satellite broadcast system 16 employing two terrestrial repeater stations 17 and 18 according to the present invention. System 16 reduces deep fading of signals transmitted from terrestrial repeater stations by adding a time-varying phase shift $f_1$ and $f_2$ to each signal transmitted from repeater stations 17 and 18, respectively, wherein $f_1$ and $f_2$ are RF signals.

The time-varying phase shifts added at each terrestrial repeater station are different so that signals are transmitted from each repeater station and thus received at the final destination at different phases, thereby reducing the deep fading interference and enabling strong, clear signals to be received. The time-varying phase shift can be added to a signal at any stage of its processing by a repeater station. Specifically, the phase shift can be added to the signal while it is an RF signal, an intermediate frequency (IF) signal or a baseband signal.

Adding the phase shift to an RF or IF signal will result in a small bandwidth expansion of the signal. However, this expansion will not usually adversely affect the integrity of the broadcast system. Adding the phase shift to the baseband signal will avoid any such bandwdith expansion. System 16 can be used in both code division multiple access (CDMA) and orthogonal frequency division multiplexing (OFDM) systems.

System 16 is comprised of repeater stations 17 and 18. Repeater station 17 includes a receive antenna 19 which receives a signal from a satellite, a first bandpass filter 20 which filters the received signal, a low-noise amplifier 21 which amplifies the once filtered signal, a phase-shifter 22 which adds a time-varying phase shift to the once filtered signal, a second bandpass filter 23 which filters the output of the phase-shifted shifted signal, a high-power amplifier 24 which amplifies the output of the second bandpass filter, and a transmit antenna 25 which transmits the phase shifted signal. Similarly, repeater station 18 includes a receive antenna 26, a first bandpass filter 27, a low-noise amplifier 28, a phase-shifter 29 which introduces a time varying phase shift different from that introduced by phase shifter 22, a second bandpass filter 30, a high-power amplifier 31 and a transmit antenna 32. Receive antennas 19 and 26 are geographically separated from transmit antennas 25 and 32, respectfully, so that the signals transmitted from the transmit antennas are statistically independent.

The present invention can be implemented using n number of terrestrial repeater stations. The size and type of geographic area, e.g. large metropolitan area with a large number of sky scrapers which can interfere with the reception of signals, will determine the actual number of terrestrial repeater stations used. In addition, the present invention can be used to transmit signals from n number of satellites.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the embodiment may be varied without departing from the spirit of the invention, and the exclusive use of all modifications which come within the scope of the appended claims is reserved.

What is claimed is:

1. A method for reducing deep fading of signals in satellite broadcast systems, comprising the steps of:

adding a time-varying phase shift to a signal received from a satellite by at least two terrestrial repeater stations; and transmitting the phase-shifted signal from each one of the at least two terrestrial repeater stations to a receiver at a different phase so that the phase-shifted signal from each terrestrial repeater station is received at the receiver at the different phase, thereby reducing any deep fading of the signal.

2. The method according to claim 1, wherein the phase shift is an RF signal.

3. The method according to claim 1, wherein the phase-shifted signal transmitted from each one of the at least two terrestrial repeater stations are statistically independent.

4. The method according to claim 1, wherein the phase shift is added to an RF signal.

5. The method according to claim 1, wherein the phase shift is added to an an IF signal.

6. The method according to claim 1, wherein the phase shift is added to a baseband signal.

7. The method according to claim 1, wherein the method is employed in a code division multiple access system.

8. The method according to claim 1, wherein the method is employed in an orthogonal frequency division multiplexing system.

* * * * *